United States Patent [19]

Reil

[11] 4,196,035
[45] Apr. 1, 1980

[54] APPARATUS FOR APPLYING STRIPS TO COATED WEB MATERIAL

[75] Inventor: Wilhelm Reil, Bensheim-Auerbach, Fed. Rep. of Germany

[73] Assignee: Tetra Pak Development S.A., Lausanne, Switzerland

[21] Appl. No.: 904,509

[22] Filed: May 10, 1978

[30] Foreign Application Priority Data

May 12, 1977 [DE] Fed. Rep. of Germany ....... 2721333

[51] Int. Cl.² .................. B32B 31/00; B65H 25/00; B31B 17/02
[52] U.S. Cl. ............................ 156/361; 156/518; 156/520; 156/552; 93/36.6; 53/128
[58] Field of Search ............... 156/518, 520, 553, 552, 156/361; 53/477, 410, 412, 128, 133; 93/36.6, 36 PC, DIG. 1, 1 TS

[56] References Cited

U.S. PATENT DOCUMENTS

| | | | |
|---|---|---|---|
| 1,215,464 | 2/1917 | Armstrong | 53/477 |
| 1,977,046 | 10/1934 | Cumfer | 156/420 |
| 3,200,557 | 8/1965 | Schwenk | 53/477 |
| 3,585,097 | 6/1971 | Beason | 156/583 |
| 3,982,991 | 9/1976 | Hamm et al. | 156/515 |

Primary Examiner—John T. Goolkasian
Assistant Examiner—L. E. Rodgers
Attorney, Agent, or Firm—Biebel, French & Nauman

[57] ABSTRACT

The invention relates to a method for applying plastics strips to an optionally partially perforated supporting material web which has been made impervious to liquid through plastics coating of the entire surface area and in which the web is conveyed from a wind-off reel to a wind-up reel or to a packaging machine and to an apparatus for performing this method.

8 Claims, 8 Drawing Figures

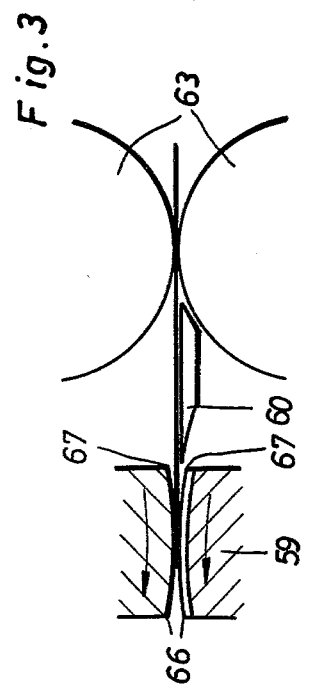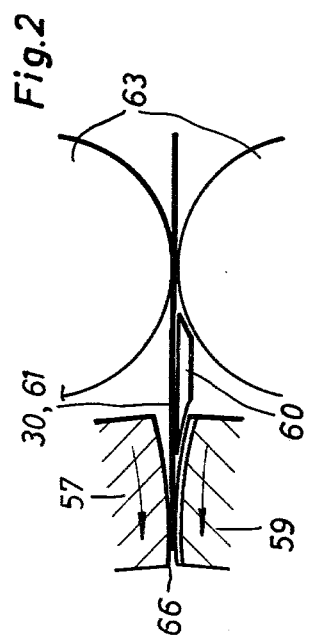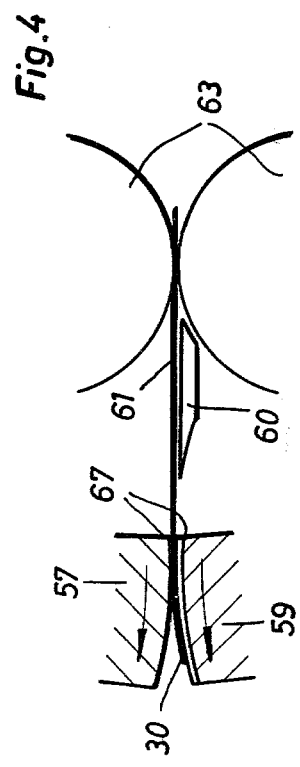

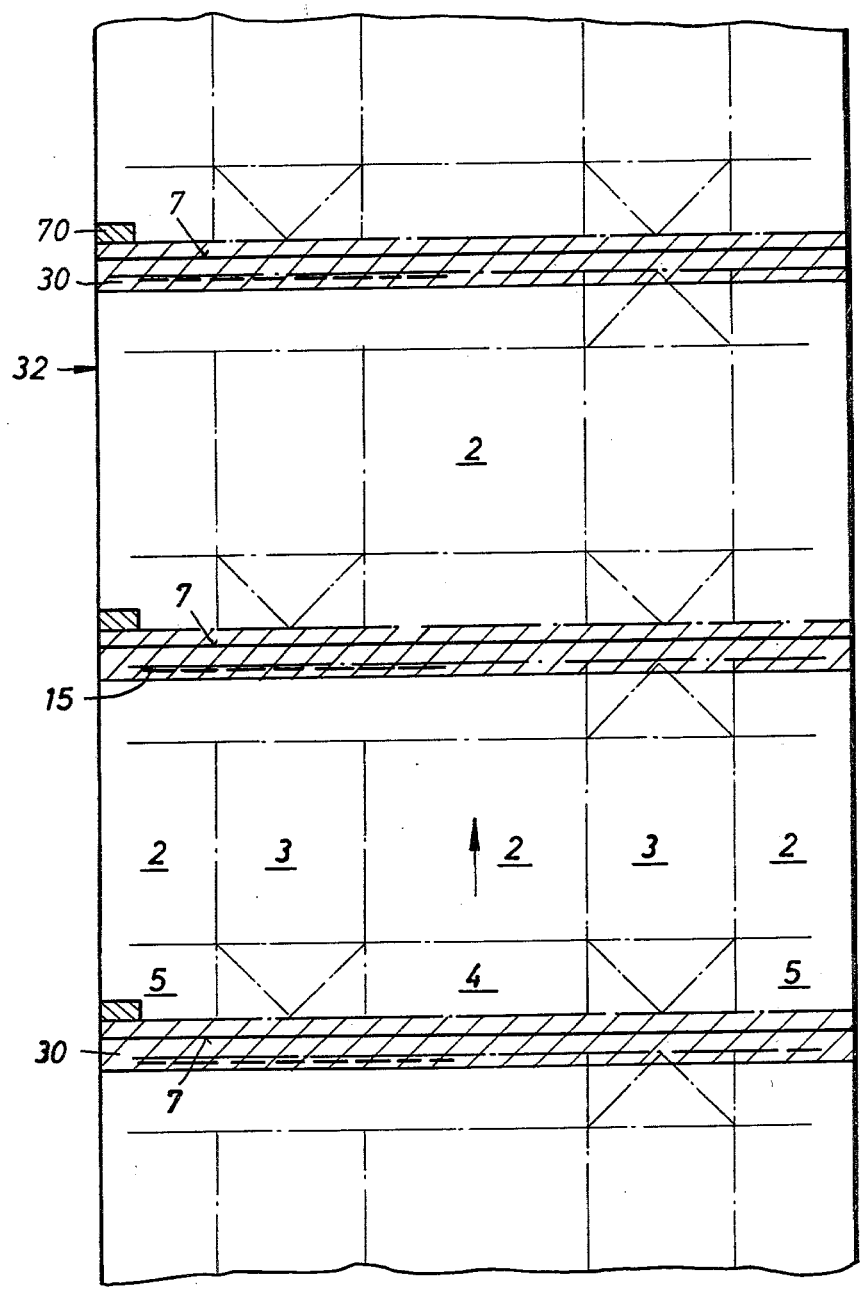

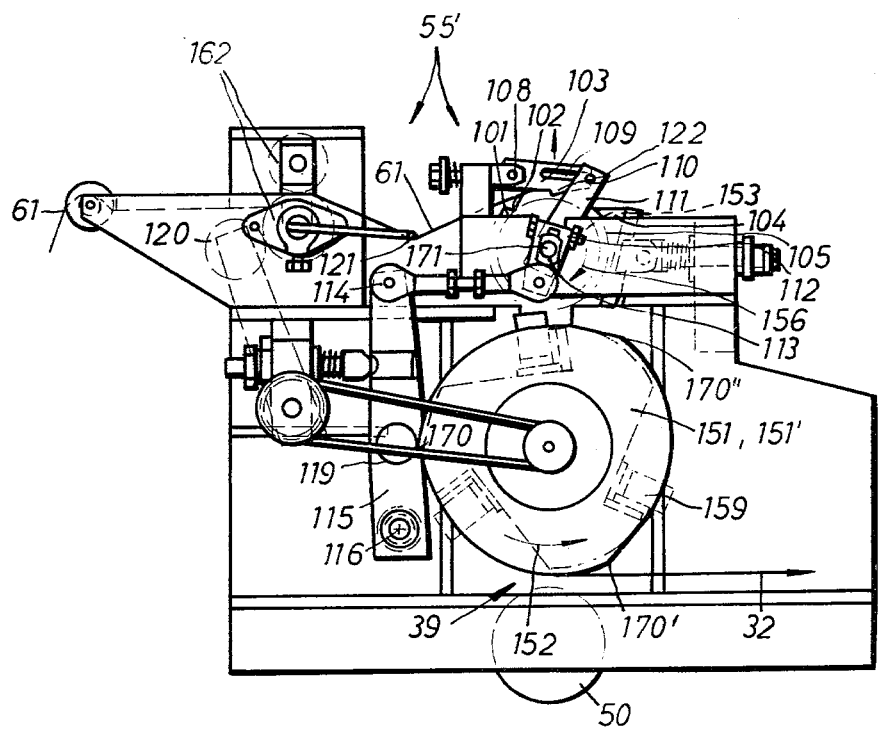

APPARATUS FOR APPLYING STRIPS TO COATED WEB MATERIAL

BACKGROUND OF THE INVENTION

At present increasing use is being made of disposable packs for liquids, particularly milk, fruit juices and the like. Parallelepipedic cardboard packs for milk are known in which paper or board is used as the supporting material and the latter is coated on at least one side and preferably both sides with a plastics material, in many cases polyethylene. In general the blanks for such packs are in one piece and are pre-grooved and provided with partial perforations in such a way that for the finished liquid pack three connecting seams, which are also called welds, are provided. This is the so-called longitudinal weld which extends along the height of the parallelepipedic pack and the two transverse welds on the top and bottom of the pack.

The opening means for such packs is generally located on the top thereof, whereby numerous different constructions are available for such opening means. In certain of these the upper transverse weld is torn through and the cardboard strip containing the transverse weld formed as a result thereof and through a previously provided perforating line is torn off to one side along the perforating lines. In other known opening means the transverse weld is itself torn open and in other known packs opening takes place by means of scissors or a knife.

Packs are also known in which the top is punched out in the form of a hole, whereby the latter is covered both from the bottom and from the top by a separate plastics strip, so that on tearing off the outer covering strip the inner strip located in the vicinity of the hole is also torn off whilst exposing the latter. However, numerous attempts have already been made to provide easily opening spouts but which still guarantee the liquid seal and in which it is not necessary to seal on a separate plastics strip from the inside and from the outside or optionally just from one side.

Thus, a liquid pack is e.g. known from German Utility Model 1,955,846 which is produced in such a way that initially a flat blank provided with grooves is supplied. The cardboard material is initially perforated and grooved or cut and then a plastics coating is applied, so that the plastics coats applied to both sides of the supporting material are not themselves perforated. Although this and similar whole-area coatings are necessary for ensuring the liquid seal when providing perforations for an appropriate opening means, it is a disadvantage thereof that large amounts of material are required. Therefore, if it was not necessary to provide the sealing of the opening means on the one hand and the welds on the other, it would only be necessary to use a fraction of the quantity of plastics material applied to the inside and optionally the outside of the pack. If this plastics coating was only applied to the supporting material web comprising paper, board or the like for merely sealing in the liquid, it would only be necessary to have a single layer a few $\mu$ thick. However, as packs must necessarily have welds, a much thicker layer of plastics material must be applied to the supporting material. In the case of sealing the opening means it can also be applied after scratching, cutting or perforating.

Leaving for the moment the question of the opening means and the measures for maintaining the necessary seal, in connection with which numerous special problems occur which have been discussed in numerous publications, and on considering instead the problem of saving plastics in connection with the sealing seams, numerous interesting points arise. As has been stated hereinbefore, the whole area plastics coating of the supporting material web must be made thicker so that there is sufficient weld material at those points of the blank where sealing seams are provided during the assembly of the pack.

In known parallelepipedic packs two or more polyethylene layers are often welded together by firstly pressing them against one another and simultaneously heating the polyethylene layers to such a high temperature that the surfaces between the polyethylene layers melt together. Impulse welding is often used in the case of modern high capacity packaging machines, i.e. the heat is supplied in pulse-like manner to the weld in a quantity regulated in such a way that the intended welding temperature is obtained. For this purpose welding dies with strip heaters are used which require rapid heating and subsequently rapid cooling.

Wet welding is also known, i.e. a method in which for the production of liquid packs firstly a tube is formed and filled with liquid and in this state is introduced between two welding dies where it is sealed. On moving the welding dies apart the weight of the liquid bears in a dangerous manner on the just formed weld so that the latter frequently tears open because it had not adequately hardened.

Another method of welding along the free edges of the plastics-coated supporting material is brought about in that with the formation of the cross-sectionally hose-like curved blank the inside of one end is placed with an overlap over the outside of the other end and is welded to the latter by pressure application. A thickened strip is therefore formed along the weld because two layers of the supporting material are welded on top of one another. In this process it must be ensured that the free edge of the supporting material which is located on the inside in the hose is perfectly covered with plastics material because otherwise the liquid will penetrate into the supporting material and cause the pack to leak.

A further disadvantage of this connection of the two ends of the supporting material is the loading pattern. The latter is only located to a limited extent in the direction of the plane of the supporting material which is welded in superimposed manner. It mainly takes place at right angles to this direction because on filling with liquid the hose expands and the two welded together material ends attempt to separate. The tensile strength in the said transverse direction is however well below that in the tension direction in the plane of the superimposed material surfaces.

In another type of pack the two insides of the plastics-coated supporting material are welded together along their free edges. Here again a thickened strip is obtained because once again two layers of supporting material are welded together in superimposed manner. In this type of welded joint the point at which the weld stops towards the inner area is at particular risk. It is important that this opening point is perfectly filled or topped up with plastics material because otherwise on introducing liquid into the pack the layers of supporting material will be drawn apart or will at least be subject to cracks or leaks. In the latter type of welded joint tensile stressing again takes place at right angles to the plane of the weld surface, i.e. the tensile strength is well below that attainable in the direction of the plane of the welded together material surfaces.

It can therefore be stated that for a completely satisfactory sealing during welding, particularly at the transition points between areas with two material layers and areas with four material layers, it is necessary not only to have a good and uniform thorough heating but also adequate quantities of plastics material must be present. Therefore the plastics coating of the web of supporting material is often made thicker than would be necessary without taking account of the problems.

Admittedly attempts have already been made to join together the edges of the supporting material web formed into a tube by means of butt-welding but various difficulties have been encountered. For example, pressure processes have been used for applying liquid plastics, i.e. so-called hot melts. However, such plastics do not have a high strength. The ideal solution would be e.g. to separately apply a polyethylene film of low pressure polyethylene or another plastics film from a base material which is compatible and joinable with the material of the cardboard base coating.

An apparatus for producing a liquid-tight pack with a butt-weld is known and in particular a pack made from a continuous tube. This apparatus liquefies an extrusion granulate and introduces it directly in liquid form into the gap between the two edges of the supporting material in order to thereby form the butt weld.

However, with modern high capacity extruders sealing difficulties often occur on the packs because the plastics material is briefly overheated. The general line of development is towards economising costs and energy so that high-capacity extruders are operated at high temperatures and speeds. The plastics material partly oxidises and then is no longer joined in the desired manner to the plastics coating on the supporting material web. There is frequently a separating or a blocking action. The application of a plastics strip of a material which can be joined well to the cardboard coating has hitherto proved to be extremely difficult, particularly if high throughput capacities are required.

SUMMARY OF THE INVENTION

The problem of the invention is to provide a method of the type indicated hereinbefore with which at high operating speeds and without overheating and welding problems plastics strips can be applied to those points of the pack blank at which for the welding processes or for sealing the opening means there must be a larger quantity of plastics material than over the entire surface of the plastics-coated supporting material web, so that the latter plastics coating can be much thinner and so that when large quantities are involved considerable amounts of material can be saved. A further problem of the invention is the provision of an apparatus for performing this method.

In connection with the method the problem is solved according to the present invention in that the web with the plastics coating is passed continuously with a speed matched to the strip application through an application station, the plastics strips are supplied at a high temperature but which is below the extruder temperature, are separately supplied to the plastics coating side of the web at the same running speed and during the continuous movement of web and strips are applied to the web by pressure sealing in such a way that in the longitudinal direction of the web the strips are spaced from one another. Through this novel type of strip application and the use of pressure and heat plastics strips of desired material can be continuously applied at high speed and at intervals to the web of the blanks, thereby obviating the disadvantages of overheating during extruding and introducing additional plastics material at particular points. At the same time the strip application method according to the invention ensures that the whole area plastics coating of the supporting material web acquires a significantly smaller coating thickness. Even if the coating thickness of the plastics material on the cardboard web is reduced, accompanied by a saving of considerable quantities of plastics, this does not prejudice the sealing at the seams or at the perforations for the opening means because at these points the plastics strips can be economically applied with a high operating capacity. Compared with the coating thickness of the whole area coating of the web the plastics strips to be applied are advantageously made so thick or strong that the necessary sealing can be completely ensured for the sealing seams and perforations. An excellent seam quality is achieved due to the reduced heating of the plastics strips as compared with plastics ejected from extruders.

According to a further development of the method, the plastics material strip is removed as a foil web from a winding drum, separated into strips and are brought to the same conveying speed as the web to which they are to be applied. According to the invention, it is particularly advantageous if the separation of the plastics strips takes place by separation welding, i.e. the foil web is separated into strips along a heated edge. As a result of the novel method it is possible to apply the most varied plastics strip configurations. In the production of parallelepipedic packs it is particularly advantageous if according to the invention the plastics strip extends at right angles to the conveying direction of the coated supporting material web and preferably passes over the entire web width. In the production of a parallelepipedic pack and more particularly in a continuous production process one starts with a tube whose longitudinal sealing seam can be produced comparatively easily because the arrangement is directed in the same direction as the movement of the passing web, whilst the transverse sealing seams are at right angles to the conveying direction of the web and to the longitudinal direction of the tube. In order to produce transverse seams and supply sufficient plastics material, it has hitherto only been possible to reliably apply the plastics strips in an intermittent manner, i.e. the coated supporting material web had to be supplied discontinuously. This has reduced the throughput capacity of known machines which can be considerably increased by using the method of the invention.

The apparatus for performing the method with drive mechanisms, control mechanisms and guide rollers is characterised in that on the side of the coated supporting material web, to which is sealed the plastics strip and which is continuously conveyed through the applicator station, is driven in rotary manner a lower drum whose circumferential speed is the same as the conveying speed of the web variable by a regulating device, at an angular distance from the circumference of the lower drum are fixed heating jaws which on the side of the web can be moved past in contact engagement with a back-pressure roller rotatably fitted to the other side of the web, and that devices are provided for applying the plastics strip to the heating jaws. Thus, according to the invention it has been decided to greatly increase the capacity of such a machine by supplying the supporting material web continuously at very high speed from a wind-off reel to a wind-up reel or to a packaging machine. During the travel of said web the grooves, scratches and/or perforations are preferably applied and subsequently the plastics strip is applied by a heating jaw to the desired point on a rotating drum by moving web and strip past a back-pressure roller. Contact engagement now takes place which ensures the adhesion of the plastics strip to the web.

According to the invention, the strip applicator devices have an upper drum which is at an angular distance from the back-pressure roller is arranged counter to the rotation direction of the lower drum and can be brought at least partly into contact engagement with the heating jaws of said lower drum. The circumferential speed of the upper drum at the time of contact can be adjusted so that it is the same as regards amount and unwinding direction as the lower drum by means of a synchronising mechanism, whilst having a device for feeding the plastics strips between the heating jaws and the upper drum. Thus, the principle according to the invention is based on the use of two oppositely rotating juxtaposed rotary drums having the same unwinding speed. The upper drum always receives the plastics strip and supplies it or applies it to the heating jaws spacedly arranged on the circumference of the lower drum. Following application the strips are heated during rotation with the lower drum, e.g. to 100° or 120° C. and in this state in the applicator station are applied to the supporting material web whilst being supported against the back-pressure roller. This obviates the otherwise necessary long welding times because during its transfer path over a 180° rotation the strip is thoroughly heated and immediate joining is brought about during line contact of the supporting material web of the counter-pressure jaw.

According to the invention it is particularly advantageous if the strip supply device has a freely rotatably mounted foil unwinding reel, a feed gear and a sliding guide rail which tangentially reaches the upper and lower drums, and if the feed gear has two successively arranged pairs of feed rollers in the conveying direction, one of which is driven continuously and the other discontinuously. Obviously the manufacture of blanks, no matter whether it is for actual packaging or for the plastics strips, is performed in the cheapest and fastest manner on a continuous basis in the form of a web which is removed from a wind-off reel. Whilst bringing about labour savings the apparatus according to the invention functions both reliably and rapidly because very simple means are provided in order e.g. by means of a pair of feed rollers to draw the foil web continuously from the foil wind-off reel, whilst the next pair of feed rollers, in the conveying direction, and whilst leaving an intentionally formed foil web loop between the two pairs of feed rollers, the foil web is guided discontinuously over the sliding guide rail directly between the upper and lower drums. It is obvious that the rotation speed of the pairs of feed rollers is precisely synchronised by known devices in such a way that a plastics strip is supplied by the sliding guide rail for separation between the upper and lower drums whenever at the time of transfer a heating jaw is at the contact point.

According to a second embodiment of the invention, the strip supply apparatus has a freely rotatable foil wind-off reel and a feed gear comprising a pair of continuously driven feed rollers and the upper drum arranged behind the same in the feed direction and which is intermittently driven and coated over its entire surface with a friction facing, whilst it also has a free-wheel and a wheel with lug cams which can be successively engaged with a synchronously controlled stop lever, and that alongside the upper drum is arranged a spring-mounted, pre-stressed guide shoe whose pressure surface is adapted to the surface of the upper drum. With respect to the strip supply apparatus the technical effect of this second embodiment is the same as that obtained with two pairs of feed rollers. However, the advantage of the second embodiment compared with the first is that one pair of feed rollers can be omitted and instead the upper drum is intermittently driven via a cam-controlled lever connection, not only for the separation welding and the separation of the plastics strips but also for the transfer thereof to the heating jaws of the lower drum. A scanning member arranged between the intermittently driven upper drum and the continuously running feed rollers is located in the intermediately formed loop of foil web comprising plastics strips and ensures that said loop does not become too large but on the other hand does not disappear. This is brought about by a control of the continuously rotating feed rollers. The spring-mounted guide shoe preferably has a polytetrafluoroethylene-coated surface which is pressed onto the friction surface of the upper drum under the pressure of a spring so that said upper drum with the superimposed foil web is always subject to a certain frictional resistance which immediately brings about a stoppage if the drive cuts out. However, in order to reliably prevent in all cases any risk of continued moving of the upper drum due to inertia forces, said stop lever which is equipped with a cam engages with the lug cam on the wheel fixed to the upper drum so that a precise stoppage of the upper drum is ensured at the desired moment, thus permitting the plastics strips to be individually separated from the web by separation welding. A precise description of this specific embodiment is provided hereinafter.

Whereas the upper drum can be provided over its entire circumference with a covering of elastic material, e.g. silicon rubber, it is particularly advantageous according to the invention if said upper drum has circumferentially and at angular spacings elastic pressure jaws and if between the same activator cams are provided for the regulating device. The expert is immediately in a position of so matching the radii of the upper and lower drums to one another and to make the angular spacings of the pressure jaws of heating jaws arranged on the circumference in such a way that the desired above-described actions are obtained. The elastic pressure jaws, e.g. of silicone rubber, ensure that the lining material used on the upper drum is only provided at the necessary points, leading to a considerable saving of material. The activator cams are not absolutely necessary but are preferably provided at those points where in any case free space is available on the upper drum circumference between the elastic pressure jaws. The cams in fact move past a timing switch which at the desired moment controls a photoelectric cell located in the vicinity of the back pressure roller in order at this time to receive a signal due to a register printer located on the supporting material web. If these signals do not occur at the desired time, an acceleration or deceleration control signal is passed to the drive of the supporting material web. According to the invention, it is assumed that the lower drum receives a constant angular velocity to which must be set both the feed speed of the web and the rotation speed of the upper drum and of the feed gear.

According to an advantageous further development of the invention, the heating jaws on the lower drum have in each case the configuration of a ledge which preferably extends over the complete drum width and their front contact surface is covered with polytetrafluoroethylene. As a result of the ledge configuration of the heating jaw, a desired strip form of the plastics material can be individually separated, heated, transferred and applied to the web. The coating of the front of the heating jaws prevents any sticking of the plastics strip heated to 100° or 120° C. so that the transfer to the supporting material web at the point where the heating jaw passes the back pressure roller is ensured without any possibility of error.

According to the invention, it is also advantageous if the regulating device has a controllable feed drive for the supporting material web with feed roller and counter roller, a timing switch positioned alongside the upper drum and a photoelectric cell arranged alongside the web and controlled by the timing switch. In the manner described hereinbefore, this regulating device acts, for example, on the driving mechanism for the supporting material web. This driving mechanism comprises a roller or a wheel driven by a motor covered by a tyre of elastic material over which runs the supporting material web. On the side opposite to the web is provided a back pressure roller which can be moved in the direction of the feed roller provided with the elastic tyre. This movement is effected by a pressure cylinder which on increasing the pressure presses in the elastic tyre and consequently reduces the effective radius of said tyre. The feed speed of the web then automatically decreases.

BRIEF DESCRIPTION OF THE DRAWINGS

Further advantages, features and possible uses of the invention can be gathered from the following description and the drawings, wherein show:

FIG. 2 to 4 details of FIG. 1 at the point indicated by the circle A and namely in three different working conditions;

FIG. 7 part of the supporting material web with a specific blank configuration in a broken away representation;

FIG. 8 another embodiment based on the principle of FIG. 1, but in this case the upper drum assumes the function of the intermittently driven pair of feed rollers.

DESCRIPTION OF THE PREFERRED EMBODIMENTS

Figure 1:
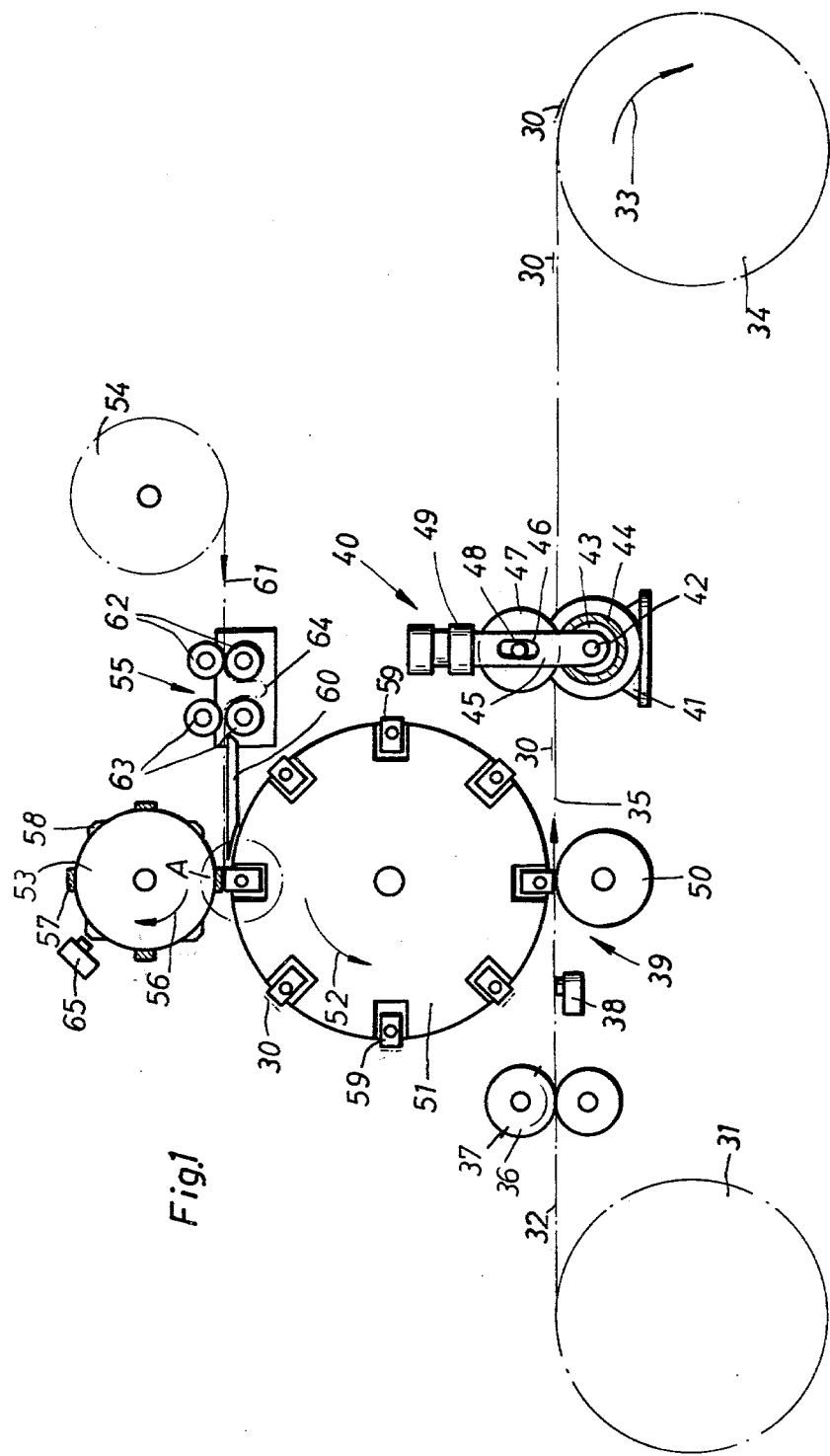
FIG. 1 a diagrammatic view of the construction of the apparatus according to the invention according to a specific embodiment.

FIG. 1 diagrammatically shows the complete apparatus for applying plastics strip 30. From a fixed rotatably arranged wind-off reel 31 the supporting material web 32 runs approximately horizontally to the wind-on reel 34 rotated in the direction of arrow 33, whereby in the straight horizontal intermediate portion the web is conveyed in the direction of arrow 35. Viewed in the feed direction the web is firstly conveyed through a stamping device 36 which comprises two oppositely rotated rollers, whereby the upper roller is provided with grooved edges or cutting blades 37, after which it passes a photoelectric cell 38 through applicator station 39 and finally through the drive mechanism designated overall by the reference numeral 40. The latter has a stationary motor 41 on whose shaft 42 is mounted a feed roller 43 with an elastic, e.g. rubber tyre 44. By means of a frame 45 with an elongated hole 46 a back pressure roller 47 can be moved upwards and downwards by means of its shaft 48 projecting through said hole 46, whereby the lower position can be secured by the pressure cylinder 49.

The applicator station 39 essentially comprises a back pressure roller 50 fitted in rotatable manner beneath the supporting material web 32 and which faces the lower drum 51. The connecting line of the rotation axis of back pressure roller 50 and the lower drum passes perpendicular to the plane of the supporting material web 32.

As an extension to said line, an upper drum 53 is fitted in rotary manner above the lower drum 51 which rotates in the direction of arrow 52, whereby drum 53 together with the foil wind-off reel 54 and gear 55 constitutes the strip applicator. Upper drum 53 rotates in the direction of arrow 56 at a circumferential speed which is the same as the circumferential speed of lower drum 51. The speeds and diameters of the two drums 51 and 53, the spacings of the pressure jaws 57 and the circumferentially angularly spaced cams 58 are matched to one another in such a way that when the machine is operating a pressure jaw 57 always precisely faces a heating jaw 59. Said heating jaws 59 are located on the circumference of lower drum 51 in an equi-distant angular distance and thus in the same way as pressure jaws 57 have the form of an elongated ledge which in the present embodiment extends over the entire length of the lower drum 51 or the upper drum 53.

Plastics strips 30 are supplied in the form of a foil web 61 from gear 55 via a sliding guide rail 60 to the plastics strip transfer station shown in the circular cut-away portion A of FIG. 1, and are individually separated in the manner to be described hereinafter relative to FIGS. 2–4. The feed gear 55 has a first pair of continuous feed rollers 62 and, viewed in the conveying direction of foil web 61, a second pair of feed rollers 63 located behind the same which rotate discontinuously but with a synchronous speed with respect to drums 51 and 53. A foil web loop 64 is formed between feed rollers 62 and 63 in order to ensure the transfer of the foil web 61 supplied continuously by foil wind-off reel 54 and the discontinuous removal by the front feed rollers 63. In operation web 61 of the successively arranged plastics strips 30 is removed from the loops 64 by means of the intermittently functioning feed rollers 63 and is then separated in area A between heating jaw 59 and pressure jaws 57 by separation welding in the manner to be described hereinafter. The heating jaws 59 have a polytetrafluoroethylene surface which prevents any sticking of the heated strip 30. Firstly plastics strip 30 is applied to heating jaw 59 arranged at the top of lower drum 53 in FIG. 1. On rotating the lower drum in the direction of arrow 52 the upper heating jaw 59 moves into the next position which is rotated to the left by 45° whilst the next heating jaw to the right is introduced into area A and the next plastics strip 30 is applied. In this way one heating jaw 59 after the other is covered with a plastics strip 30, the plastics strips are separated accompanied by heating to 100 and preferably 120° C., and are fed in a counter-clockwise direction downwards to the back pressure roller 50 over which runs the supporting material web 32. In this way the plastics strips 30 can be accurately pressure-sealed to the desired point on the supporting material web 32 at applicator station 39.

In order that this takes place at the desired points, a regulating device is provided which comprises photoelectric cell 38, activator cam 65, control cam 58 and not shown electrical and pneumatic control devices for pressure cylinder 49 of drive 40. In the already described manner the running speed of the supporting material web 32 is synchronised with the speed of lower drum 51.

The separation of the plastics strips 30 will be explained hereinafter relative to FIGS. 2 to 4. The two discontinuously operating feed rollers 63 between whose gap passes foil web 61 are shown to the right. In FIGS. 2 to 4 the foil web is then moved further to the left via sliding guide rail 60 to the clamping point designated by A in FIG. 1, i.e. between the pressure jaw 57 which has just been moved past and heating jaw 59. As already stated, pressure jaw 57 is fitted at an angular spacing on the circumference of upper drum 53 whilst the heating jaws 59 are arranged on the circumference of lower drum 51 at an angular spacing adapted thereto. The arrows shown in the two jaws 57 and 59 of FIGS. 2 to 4 indicate the direction of movement thereof. 66 is a leading edge of the particular jaw 57 or 59 and 67 is the relevant trailing edge of said jaws. Thus, feed rollers 63 intermittently feed the plastics strip 30 via sliding guide rail 60 to the leading edge 66 according to FIG. 2 at which the jaws 57 and 59 grasp the front end of the plastics strip and carry it along. The strip 30 is heated by the close contact with heating jaw 59. The heating state is in particular obtained with the state according to FIG. 3. If on further rotating jaws 57 and 59 on the one hand and feed rollers 63 on the other the position shown in FIG. 4 is reached, feed rollers 63 suddenly stop, a tension is exerted on the trailing edge 67 between jaws 57 and 59 which causes the tearing away of the secured strip from the remaining strip still located on the sliding guide rail 60 by performing a separation welding process. Thus, the separation welding line is located at edge 67. As stated hereinbefore, the individual plastics strips 30 separated by separation welding, i.e. by tearing away behind edge 67, remain on the particular heating jaw 59 and are moved downwards in the direction of arrow 52 by the rotation of lower drum 51. At the bottom they are applied at a temperature of 120° C. to the point on the supporting material web 32 supported by the back pressure roller 50. Roller 50 has a rubber surface so that here again a uniform and satisfactory transfer is ensured. Due to the polytetrafluoroethylene coating of heating jaw 59 plastics strip 30 is completely transferred to the supporting material 32. This process takes place extremely rapidly because an immediate welded joint is formed between strip 30 and the plastics-coated surface of the supporting material web 32, because the pressure and temperature of 120° satisfy the fundamental prerequisites.

Figure 5:
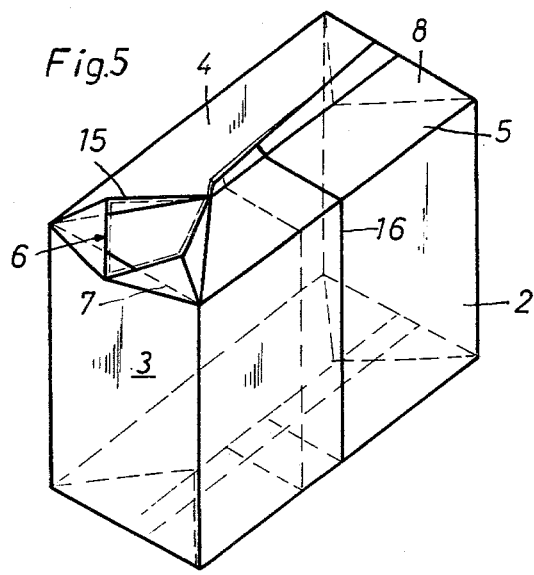
FIG. 5 a parallelepipedic pack which is open for pouring purposes and which can be made and assembled from a special supporting material blank web.

FIG. 5 shows the pack in the erected state already opened at the spout. FIG. 5 shows a large lateral surface 2, a narrow side 3 and a top comprising two cardboard layers 4 and 5. Spout 6 is located on the upper narrow edge 7. A triangular cornerpiece 8 is shown by means of dotted lines on the facing narrow edge. The outer end of spout 6 is also located in such a cornerpiece.

Figure 6:
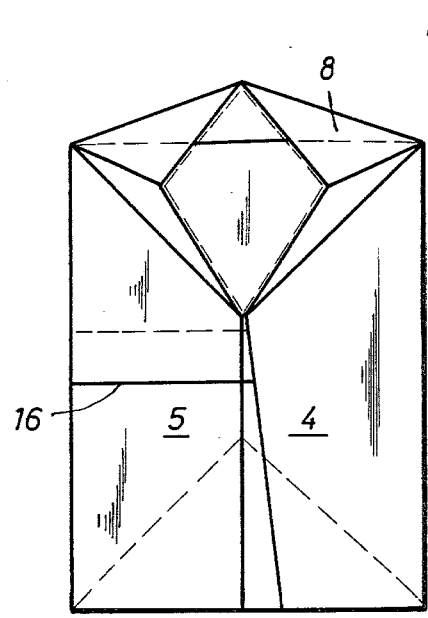
FIG. 6 a plan view of the finished pack prior to opening but after raising one of the triangular tabs.

FIG. 6 shows the pack from above whereby the front cornerpiece 8 is flapped upwards and the spout is torn open. It is possible to see the edges of the perforation line 15 running parallel along the transverse sealing seam, together with the longitudinal sealing seam 16.

FIG. 7 shows the blank, i.e. a portion of supporting material web 32 cut away at the top and bottom and with the plastics strip 30 sealed on at the desired points. It is once again possible to see the narrow sides 3, lateral surfaces 2 and cardboard layers 4 and 5. The perforation line 15 is located within the sealed on plastics strip 30 in which is also located the cutting position 7 of the pack. The register printer 70 is fitted in conventional manner and is provided in order to ensure a corresponding speed control by means of the passing photoelectric cell 38. As has already been stated, FIGS. 5 to 7 relate to a special embodiment of a parallelepipedic pack which can, for example, be processed with the machine according to the invention. It is not necessary for plastics strip 30 to be as wide as shown in FIG. 7, this merely being provided here so that all the endangered points are covered with the plastics reinforcement.

Finally, FIG. 8 shows the other embodiment of the strip feed apparatus modified relative to FIG. 1. In the lower part it is possible to see the back pressure roller 50 and the applicator station 39. In this embodiment the lower drum is designated by reference numeral 151, whereby it is only possible to see in this drawing from the front the cam plate with the projecting cams 170, 170′, 170″. The lower drum 151 rotates in the direction of arrow 152. In angular distances of 120° three heating jaws 159 are provided on drum 151 in the manner described relative to FIG. 1.

Above the lower drum 151 is provided the upper drum 153 located via a not shown free-wheel on shaft 171, in the same way as wheel 101 with lug cam 102. Upper drum 153 can be rotated in the direction of arrow 156. To the right of drum 153 is provided the spring-mounted guide shoe 104 whose surface 105 which is adapted to the surface of drum 153 presses against said drum, whilst foil web 61 passes between the pressure surface 105 and the surface of drum 153.

A stop lever 103 is movably spring-mounted about the pivot 108 on the side facing guide shoe 104 via a not shown mounting support, whilst the front thereof carries a guidance slot 109. Roller 110 of control lever 111 runs in said slot 109, whilst lever 111 like shim 112 is fixed to shaft 171 of upper drum 153. Between shim 112 and shaft 171 is provided an eccentric bush 113 whose rotation permits the adjustment of the spacing between the circumferential surface of drum 153 and the front contact surface of heating jaws 159.

In the manner shown in FIG. 8 one side of shim 112 is connected via a connecting lever 114 with a drive lever 115 which can pivot about shaft 116. Drive lever 115 is so pre-stressed by means of a support member 118 prestressed by a compression spring 117 that the cam follower 119 always engages with the outer surface of plate cam 151′.

Feed gear 55′ has a pair of feed rollers 162 continuously driven by a pressure roller 120 and between which can be drawn the foil web 61. Web 61 of plastics strips 30 passes a scanning member 121 whilst forming a type of loop and then to the upper drum 153 whose wheel 101 has inwardly directed stop recesses or lug cams 102 which are arranged in a specific angular spacing on the periphery of wheel 101 and can be engaged with the stop cam 122 which is fitted to the stop lever 103.

In operation the strip feed apparatus of FIG. 8 functions as follows. By means of the driven pressure roller 120 the feed rollers 162 are driven and draw the foil web plastics strips 30 to the right in the drawing plane and beneath the scanning member 121. If the scanning member detects a too great sag or a too limited tension in the loop of foil web 61 it transmits a signal to a not shown pneumatic device which raises roller 120, so that momentarily the drive of the continuously operating feed rollers 162 is interrupted. The tension in the loop of web 61 immediately rises and the scanning member 121 can then again control the contact pressure of pressure roller 120, e.g. if the foil web 61 is drawn to the right and around the upper drum 153. The intermittent movement thereof in the direction of arrow 156 takes place in the manner indicated hereinafter.

It is assumed that the upper drum 153 is precisely at the position in which projection 122 on stop lever 103 has entered the lug cam 102 and consequently guarantees a reliable stopping of upper drum 153 without inertia movements causing a further rotation of drum 153 even if the drive of drum 153 which is movable by means of the free-wheel has already been switched off. The various levers 111, 112, 114 and 115 are then in the position shown in FIG. 8. If the cam 170 which is furthest to the left in the drawing moves cam plate 151' in direction 152, i.e. downwards, then the radius of the outer surface of the cam plate slowly decreases until just before the next cam 170". This means that the cam follower 119 located on drive lever 115 and is prestressed by compression spring 117 and the support member 118 on the circumferential surface of cam plate 151' is moved to the right in the drawing, so that the drive lever 115 rotates about its shaft 116 in such a way that the connecting lever 114 according to FIG. 8 is displaced to the right and consequently shim 112 and control lever 111 can be rotated to the left.

Consequently roller 110 rolls to the left in the guidance slot 109 of stop lever 103 and raises the latter in such a way that the projecting cam 122 is moved out of the lug cam 102.

When now the next cam 170" of cam plate 151' runs against the cam follower 119 the intermittent drive of upper drum 153 takes place through the drive lever 115 being rotated in the opposite direction, i.e. to the left in the drawing of FIG. 8. Thus, upper drum 153 with wheel 101 rotates in the direction of arrow 156 so that between heating jaw 159 and the outer surface of upper drum 153 the state according to FIG. 2 is reached, after further rotation the state according to FIG. 3 and finally that according to FIG. 4 which again represents the position shown in FIG. 8. Otherwise the separation of plastics strips 30 and their transfer with the lower drum 151 to the supporting material web 32 take place in the manner described relative to FIG. 1.

I claim:

1. An apparatus for applying plastics strips (30) to an optionally partially perforated supporting material web (32) which has been made impervious to liquid through plastics coating of the entire surface area and in which the web is conveyed from a wind-off reel to a wind-up reel or to a packaging machine, characterised by an application station (39), means for passing and conveying the web (32) with the plastics coating continuously through the application station, a lower drum (51) on the side of the coated supporting material web (32) to which is sealed the plastics strip (30), means for driving the lower drum (51) in rotary manner, means for matching the speed of the material web (32) and the circumferential speed of the lower drum (51), fixed heating jaws (59) on and at an angular distance around the circumference of the lower drum (51) which on the side of the web (32) can be moved past in contact engagement with a back-pressure roller (50) rotatably fitted to the other side of the web, means (53, 54) for applying the plastics strip (30) to the heating jaws (59), the heating jaws (59) supplying the plastics strips (30) at a high temperature but which is below the extruder temperature, and supplying the plastic strips (30) to the plastics coating side of the web (32) at the same running speed and during the continuous movement of web (32) to apply the strips (30) to the web (32) by pressure sealing in such a way that in the longitudinal direction of the web (32) the strips (30) are spaced from one another.

2. Apparatus according to claim 1 characterized in that the heating jaws (59) are held at a temperature which maintains the strips (30) on the jaws (59), and wherein a foil web (61) is divided into the strips (30) by means guiding the web (61) over the jaws (57, 59), and separated by their edges (67), assisted by means for stopping feeding of the foil web (61).

3. Apparatus according to claim 1, characterised in that the strip applicator (53 to 55,60) has an upper drum (53) at an angular distance from the back pressure roller (50), arranged in the opposite rotation direction (52) to the lower drum (51) and which can be brought into at least partial contact engagement with the heating jaws (59) of lower drum (51), whereby the amount and unwinding direction of the circumferential speed can be made the same as that of the lower drum by means of a synchronising device, whilst an apparatus (55,60) is provided for feeding the plastics strips (30) between the heating jaws (59) and the upper drum (53).

4. Apparatus according to claim 1 or 3, characterised in that the strip supply apparatus has a freely rotatably mounted foil wind-off reel (54), a feed gear (55) and a sliding guide rail (60) which tangentially reaches the upper and lower drums (53,51) and that the feed gear (55) has two successively arranged pairs of feed rollers (62,63) in the feed direction, and means for driving one pair of rollers continuously and the other intermittently.

5. Apparatus according to claim 1 or 3, characterised in that the strip supply apparatus has a freely rotatable foil wind-off reel and a feed gear (55') comprising a pair of continuously driven feed rollers (162) and the upper drum (153) arranged behind the same in the feed direction and which is intermittently driven and coated over its entire surface with a friction facing, whilst it also has a free-wheel and a wheel (101) with lug cams (102) which can be successively engaged with a synchronously controlled stop lever (103) and that alongside the upper drum (153) is arranged a spring-mounted, prestressed guide shoe (104) whose pressure surface (105) is adapted to the surface of upper drum (153).

6. Apparatus according to claim 1 or 3, characterised in that the upper drum (53) circumferentially has elastic pressure jaws (57) with an angular spacing and that preferably activator cams (58) are located between the same for the regulating device (38,65).

7. Apparatus according to claim 1 or 3, characterised in that on the lower drum (51) the heating jaws (59) in each case have the configuration of a ledge which preferably extends over the entire width of the drum and whose front contact surface is covered with polytetrafluoroethylene.

8. Apparatus according to claim 1 or 3, characterised in that the regulating device has a controllable feed drive (40) for the supporting material web (33) with feed rollers (43,44) and back roller (47), a timing switch located alongside the upper drum (53) and a photoelectric cell (38) positioned alongside web (32) and controlled by the timing switch (65).

* * * * *